United States Patent
Bradshaw et al.

(10) Patent No.: US 11,636,334 B2
(45) Date of Patent: Apr. 25, 2023

(54) MACHINE LEARNING WITH FEATURE OBFUSCATION

(71) Applicant: Micron Technology, Inc., Boise, ID (US)

(72) Inventors: Samuel E. Bradshaw, Sacramento, CA (US); Shivasankar Gunasekaran, Folsom, CA (US); Sean Stephen Eilert, Penryn, CA (US); Ameen D. Akel, Rancho Cordova, CA (US); Kenneth Marion Curewitz, Cameron Park, CA (US)

(73) Assignee: Micron Technology, Inc., Boise, ID (US)

( * ) Notice: Subject to any disclaimer, the term of this patent is extended or adjusted under 35 U.S.C. 154(b) by 730 days.

(21) Appl. No.: 16/545,837

(22) Filed: Aug. 20, 2019

(65) Prior Publication Data
US 2021/0056405 A1 Feb. 25, 2021

(51) Int. Cl.
*G06N 3/08* (2006.01)
*G06F 21/60* (2013.01)
(Continued)

(52) U.S. Cl.
CPC ............ *G06N 3/08* (2013.01); *G06F 21/602* (2013.01); *G06N 3/0454* (2013.01); *G06N 20/00* (2019.01); *G06F 21/6254* (2013.01)

(58) Field of Classification Search
CPC ........ G06N 3/08; G06N 3/0454; G06N 3/063; G06N 3/06; G06N 3/02; G06N 20/00;
(Continued)

(56) References Cited

U.S. PATENT DOCUMENTS

| 8,250,503 B2 | 8/2012 | Vorbach et al. |
| 8,686,549 B2 | 4/2014 | Vorbach |

(Continued)

FOREIGN PATENT DOCUMENTS

| JP | 2017126112 | 7/2017 |
| WO | 2019092439 | 5/2019 |

OTHER PUBLICATIONS

Jin et al., "How to scale distributed deep learning?" arXiv1611.04581v1, Nov. 14, 2016.

(Continued)

*Primary Examiner* — Shaqueal D Wade-Wright
(74) *Attorney, Agent, or Firm* — Greenberg Traurig

(57) ABSTRACT

A system having multiple devices that can host different versions of an artificial neural network (ANN). In the system, inputs for the ANN can be obfuscated for centralized training of a master version of the ANN at a first computing device. A second computing device in the system includes memory that stores a local version of the ANN and user data for inputting into the local version. The second computing device includes a processor that extracts features from the user data and obfuscates the extracted features to generate obfuscated user data. The second device includes a transceiver that transmits the obfuscated user data. The first computing device includes a memory that stores the master version of the ANN, a transceiver that receives obfuscated user data transmitted from the second computing device, and a processor that trains the master version based on the received obfuscated user data using machine learning.

20 Claims, 5 Drawing Sheets

(51) Int. Cl.
  *G06N 3/04* (2023.01)
  *G06N 20/00* (2019.01)
  *G06F 21/62* (2013.01)

(58) Field of Classification Search
  CPC .... G06F 21/602; G06F 21/62; G06F 21/6254; G06F 21/6245
  See application file for complete search history.

(56) References Cited

U.S. PATENT DOCUMENTS

| | | | |
|---|---|---|---|
| 8,819,505 | B2 | 8/2014 | Vorbach et al. |
| 8,914,590 | B2 | 12/2014 | Vorbach et al. |
| 9,245,188 | B2 | 1/2016 | Han |
| 9,413,779 | B2 | 8/2016 | Vasseur et al. |
| 9,450,978 | B2 | 9/2016 | Vasseur et al. |
| 9,503,466 | B2 | 11/2016 | Vasseur et al. |
| 9,521,158 | B2 | 12/2016 | Di Pietro et al. |
| 9,563,854 | B2 | 2/2017 | Cruz Mota et al. |
| 9,672,734 | B1 | 6/2017 | Ratnasingam |
| 9,751,534 | B2 | 9/2017 | Fung et al. |
| 9,947,145 | B2 | 4/2018 | Wang et al. |
| 10,001,760 | B1 | 6/2018 | Hoffmann et al. |
| 10,007,269 | B1 | 6/2018 | Gray |
| 10,019,654 | B1 | 7/2018 | Pisoni |
| 10,217,028 | B1 | 2/2019 | Wang et al. |
| 10,229,357 | B2 | 3/2019 | Jin et al. |
| 10,254,760 | B1 | 4/2019 | Abeloe |
| 10,275,851 | B1 | 4/2019 | Zhao et al. |
| 10,296,004 | B2 | 5/2019 | Nishi |
| 10,311,312 | B2 | 6/2019 | Yu et al. |
| 10,366,502 | B1 | 7/2019 | Li |
| 10,459,444 | B1 | 10/2019 | Kentley-klay |
| 10,599,546 | B1 | 3/2020 | Walther et al. |
| 10,611,379 | B2 | 4/2020 | Olabiyi et al. |
| 10,672,200 | B2 | 6/2020 | Wang et al. |
| 10,678,244 | B2 | 6/2020 | Iandola et al. |
| 10,713,955 | B2 | 7/2020 | Tong et al. |
| 10,733,506 | B1 | 8/2020 | Ogale et al. |
| 10,855,485 | B1 | 12/2020 | Zhou et al. |
| 10,915,663 | B1* | 2/2021 | Ferrer ................ G06V 40/172 |
| 10,994,741 | B2 | 5/2021 | Zhou et al. |
| 11,003,992 | B2 | 5/2021 | Wesolowski et al. |
| 11,120,353 | B2 | 9/2021 | Olabiyi et al. |
| 11,188,821 | B1 | 11/2021 | Kalakrishnan et al. |
| 11,328,210 | B2 | 5/2022 | Mondello et al. |
| 2013/0346350 | A1 | 12/2013 | Subramanian et al. |
| 2014/0201126 | A1 | 7/2014 | Zadeh et al. |
| 2015/0100530 | A1 | 4/2015 | Mnih et al. |
| 2015/0106308 | A1 | 4/2015 | Harrison et al. |
| 2015/0161454 | A1 | 6/2015 | Han |
| 2015/0193693 | A1 | 7/2015 | Vasseur et al. |
| 2015/0193694 | A1 | 7/2015 | Vasseur et al. |
| 2015/0193695 | A1 | 7/2015 | Cruz Mota et al. |
| 2015/0193696 | A1 | 7/2015 | Vasseur et al. |
| 2015/0193697 | A1 | 7/2015 | Vasseur et al. |
| 2015/0195145 | A1 | 7/2015 | Di Pietro et al. |
| 2015/0195146 | A1* | 7/2015 | Di Pietro ............. H04L 41/16 370/230 |
| 2015/0254555 | A1 | 9/2015 | Williams, Jr. et al. |
| 2015/0324686 | A1 | 11/2015 | Julian et al. |
| 2016/0020943 | A1 | 1/2016 | Diab et al. |
| 2016/0078339 | A1 | 3/2016 | Li et al. |
| 2016/0104047 | A1 | 4/2016 | Sibiryakov |
| 2017/0008168 | A1 | 1/2017 | Weng et al. |
| 2017/0008521 | A1 | 1/2017 | Braunstein et al. |
| 2017/0132527 | A1 | 5/2017 | Ahn et al. |
| 2017/0169208 | A1 | 6/2017 | Jantz et al. |
| 2017/0200284 | A1 | 7/2017 | Lee et al. |
| 2017/0242436 | A1 | 8/2017 | Creusot |
| 2017/0262735 | A1 | 9/2017 | Ros Sanchez et al. |
| 2017/0293808 | A1 | 10/2017 | Jain et al. |
| 2017/0305434 | A1 | 10/2017 | Ratnasingam |
| 2018/0018590 | A1 | 1/2018 | Szeto et al. |
| 2018/0018775 | A1 | 1/2018 | Piekniewski et al. |
| 2018/0025268 | A1 | 1/2018 | Teig et al. |
| 2018/0053071 | A1 | 2/2018 | Chen et al. |
| 2018/0068206 | A1 | 3/2018 | Pollach et al. |
| 2018/0082137 | A1 | 3/2018 | Melvin et al. |
| 2018/0157920 | A1 | 6/2018 | Hu |
| 2018/0164825 | A1 | 6/2018 | Matus et al. |
| 2018/0173971 | A1 | 6/2018 | Jia et al. |
| 2018/0174023 | A1 | 6/2018 | Imam et al. |
| 2018/0174457 | A1 | 6/2018 | Taylor |
| 2018/0182187 | A1 | 6/2018 | Tong et al. |
| 2018/0188733 | A1 | 7/2018 | Iandola et al. |
| 2018/0268266 | A1 | 9/2018 | Sohn et al. |
| 2018/0284735 | A1 | 10/2018 | Cella et al. |
| 2018/0285735 | A1 | 10/2018 | Baum et al. |
| 2018/0292825 | A1 | 10/2018 | Smolyanskiy et al. |
| 2018/0300964 | A1 | 10/2018 | Lakshamanan et al. |
| 2019/0019082 | A1 | 1/2019 | Dasgupta et al. |
| 2019/0034762 | A1 | 1/2019 | Hashimoto |
| 2019/0035113 | A1* | 1/2019 | Salvi .................... G06T 3/0087 |
| 2019/0050624 | A1 | 2/2019 | Chai et al. |
| 2019/0082185 | A1 | 3/2019 | Satavalekar et al. |
| 2019/0108651 | A1 | 4/2019 | Gu et al. |
| 2019/0113927 | A1 | 4/2019 | Englard et al. |
| 2019/0114530 | A1 | 4/2019 | Nishida et al. |
| 2019/0114672 | A1 | 4/2019 | Jacobs et al. |
| 2019/0121673 | A1* | 4/2019 | Gold ...................... G06T 1/60 |
| 2019/0122006 | A1 | 4/2019 | Hurry et al. |
| 2019/0122109 | A1 | 4/2019 | Busch et al. |
| 2019/0138889 | A1 | 5/2019 | Jiang et al. |
| 2019/0147254 | A1 | 5/2019 | Bai et al. |
| 2019/0147298 | A1 | 5/2019 | Rabinovich et al. |
| 2019/0147331 | A1 | 5/2019 | Arditi |
| 2019/0163737 | A1 | 5/2019 | Zhou et al. |
| 2019/0171187 | A1 | 6/2019 | Cella et al. |
| 2019/0187706 | A1 | 6/2019 | Zhou et al. |
| 2019/0187707 | A1 | 6/2019 | Zheng et al. |
| 2019/0204088 | A1 | 7/2019 | Haque et al. |
| 2019/0205744 | A1 | 7/2019 | Mondello et al. |
| 2019/0205765 | A1 | 7/2019 | Mondello et al. |
| 2019/0251396 | A1 | 8/2019 | Geraci et al. |
| 2019/0258251 | A1 | 8/2019 | Ditty et al. |
| 2019/0272433 | A1 | 9/2019 | Yu et al. |
| 2019/0279028 | A1 | 9/2019 | Wang et al. |
| 2019/0354708 | A1* | 11/2019 | Fisher .................. G06F 16/221 |
| 2020/0005135 | A1* | 1/2020 | Che ........................ G06N 3/063 |
| 2020/0019794 | A1 | 1/2020 | Engelcke et al. |
| 2020/0026283 | A1 | 1/2020 | Barnes et al. |
| 2020/0068250 | A1 | 2/2020 | Bhooi et al. |
| 2020/0209810 | A1 | 7/2020 | Bazhenov et al. |
| 2020/0242466 | A1 | 7/2020 | Mohassel et al. |
| 2020/0257301 | A1 | 8/2020 | Weiser et al. |
| 2020/0279129 | A1 | 9/2020 | Batchelor et al. |
| 2020/0342324 | A1* | 10/2020 | Sivaraman ............. G06V 10/82 |
| 2020/0380629 | A1 | 12/2020 | Monteil et al. |
| 2020/0401136 | A1 | 12/2020 | Tandola et al. |
| 2020/0411737 | A1 | 12/2020 | Barnes et al. |
| 2021/0042630 | A1* | 2/2021 | Roberts .................. G06N 20/20 |
| 2021/0056350 | A1* | 2/2021 | Curewitz ................ G06N 3/08 |
| 2021/0056387 | A1 | 2/2021 | Eilert et al. |
| 2020/0604464 | | 6/2021 | Jobling et al. |
| 2022/0327428 | A1 | 10/2022 | Sun et al. |

OTHER PUBLICATIONS

Olabiyi et al., "Driver Action Prediction Using Deep (Bidirectional) Recurrent Neural Network." arXiv:1706.02257, Jun. 7, 2017.

Skende, Andi, "Introducing 'Parker' Next-Generation Tegra System-On-Chip." Aug. 2016.

Wu et al., "SqueezeDet: Unified, Small, Low Power Fully Convolutional Neural Networks for Real-Time Object Detection for Autonomous Driving." arXiv:1612.01051v3, Nov. 29, 2017.

Aljosa Osep, et al. "Large-Scale Object Discovery and Detector Adaptation from Unlabeled Video." arXiv:1712.08832v1, Dec. 23, 2017.

Chelsea Finn, et al. "Generalizing Skills with Semi-Supervised Reinforcement Learning." Conference paper at ICLR, 2017.

(56) References Cited

OTHER PUBLICATIONS

David Stavens, et al. "A Self-Supervised Terrain Roughness Estimator for Off-Road Autonomous Driving." arXiv:1206.6872, Jun. 27, 2012.
Evan Shelhamer, et al. "Loss is its own Reward: Self-Supervision for Reinforcement Learning." arXiv:1612.07307, Mar. 9, 2017.
Guy Rosman, et al. "Hybrid Control and Learning with Coresets for Autonomous Vehicles." IEEE/RSJ International Conference on Intelligent Robots and Systems (IROS), IEEE, Sep. 24-28, 2017.
Junhong Xu, et al. "Avoidance of Manual Labeling in Robotic Autonomous Navigation Through Multi-Sensory Semi-Supervised Learning." arXiv:1709.07911v3, Oct. 9, 2017.
Miguel A. Bautista, et al. "Learning Where to Drive by Watching Others." German Conference on Pattern Recognition, Aug. 15, 2017.
Mohammed Abdulla Yousuf, et al. U.S. "Systems and Methods for Safe and Reliable Autonomous Vehicles." U.S. Appl. No. 62/584,549, filed Nov. 10, 2017.
Xiaohang Zhan. "Mix-and-Match Tuning for Slef-Supervised Semantic Segmentation." Association for the Advancement of Artificial Intelligence (AAAI), 2018.
Yiran Zhong, et al. "Self-Supervised Learning for Stereo matching with Self-Improving Ability." arXiv:1709.00930v1, Sep. 4, 2017.
International Search Report and Written Opinion, PCT/US2020/046155, dated Nov. 20, 2020.
International Search Report and Written Opinion, PCT/US2020/046159, dated Nov. 20, 2020.
Bojarski et al., "End to End Learning for Self-Driving Cars." arXiv:1604.07316v1, Apr. 25, 2016.
Fridman et al., "MIT Autonomous Vehicle Technology Study: Large-Scale Deep Learning Based Analysis of Driver Behavior and Interaction with Automation." arXiv:1711.06976v1, Nov. 19, 2017.
International Search Report and Written Opinion, PCT/US2020/046157, dated Jan. 15, 2021.
Ji Wang, et al., "Not Just Privacy: Improving Performance of Private Deep Learning in Mobile Cloud," arXiv: 1809.03428v3, Jan. 5, 2019.
Linshan Jiang, et al., "Differentially Private Collaborative learning for the IoT Edge," EWSN '19: Proceedings of the 2019 International Conference on Embedded Wireless Systems and networks, Mar. 2019.
Pan et al., "Virtual to Real Reinforcement Learning for Autonomous Driving." arXiv:1704.03952v3, May 11, 2017.
Santana et al., "Learning a Driving Simulator." arXiv:1608.01230v1, Aug. 3, 2016.
Stem et al., "Dissipation of stop-and-go waves via control of autonomous vehicles: Field experiemnts." ARxIV:1705.01693V1, May 4, 2017.
Teichmann et al., "MultiNet: Real-time Joint Semantic Reasoning for Autonomous Driving." arXiv:1612.07695v1, Dec. 22, 2016.
Tianwei Zhang, et al., "Privacy-preserving Machine Learning through Data Obfuscation," arXiv: 1807.01860v2, Jul. 13, 2018.
Vishal Anjaiah Gujjary, et al., "Letters: A neural network approach for data masking," Neurocomputing 2011, vol. 74, No. 9, Apr. 2011.
Distributed Architecture for Enhancing Artificial Neural Network, U.S. Appl. No. 15/858,143, filed Dec. 29, 2017, Inventors: Antonino Mondello et al., Status: Final Rejection Mailed, dated Feb. 11, 2022.
Self-Learning in Distributed Architecture for Enhancing Artificial Neural Network, U.S. Appl. No. 15/858,505, filed Dec. 29, 2017, Inventors: Antonino Mondello et al., Status: Publications—Issue Fee Payment Verified, Status Date: Aug. 9, 2021.
Self-Learning in Distributed Architecture for Enhancing Artificial Neural Network, U.S. Appl. No. 17/718,701, filed Apr. 12, 2022, Inventors: Antonino Mondello et al., Status: Application Undergoing Preexam Processing, Status Date: Apr. 12, 2022.
Distributed Machine Learning With Privacy Protection, U.S. Appl. No. 16/545,813, filed Aug. 20, 2019, Inventors: Sean Eilert et al., Status: Response after Final Action Forwarded to Examiner, dated Jan. 20, 2022.
Feature Dictionary for Bandwidth Enhancement, U.S. Appl. No. 16/545,854, filed Aug. 20, 2019, Inventors: Kenneth Curewitz et al., Status: Non Final Action Mailed, dated Dec. 14, 2021.
Atoum, et al. "Monocular Video-Based Trailer Coupler Detection Using Multiplexer Convolutional Neural Network." IEEE International Conference on Computer Vision, Oct. 2017.
Chen, et al. "Brain-Inspired Cognitive Model with Attention for Self-Driving Cars." Feb. 19, 2017.
Eraqi, et al. "End-toEnd Deep Learning for Steering Autonomous Vehicles Considering Temporal Dependencies." 31st Conference on Neural Information Processing Systems, Nov. 22, 2017.
Hou, et al. "Fast Recurrent Fully Convolutional networks for Direct Perception in Autonomous Driving." Nov. 20, 2017.
Liu, et al. "A Unified Cloud Platform for Autonomous Driving." IEEE Computer Society, Dec. 18, 2017.
Pan, et al. "Agile Off-Road Autonomous Driving Using End-to-End Deep Imitation Learning." Sep. 21, 2017.
Sallab, et al. "Meta Learning Framework for Automated Driving." Jun. 11, 2017.
Shapiro, Danny. "Accelerating the Race to Autonomous Cars." Aug. 2016.
Wang, et al. "Reconfigurable Processor for Deep Learning in Autonomous Vehicles." International Telecommunication Union, Sep. 2017.
International Search Report and Written Opinion, PCT/US2018/063669, dated Mar. 25, 2019.
Barnes, et al. "Driven to Distraction: Self-Supervised Distractor Learning for Robust Monocular Visual Odometry in Urban Environments." arXiv: 1711.06623v1, Nov. 17, 2017.
Barnes, et al. "Find Your Own Way: Weakly-Supervised Segmentation of Path Proposals for Urban Autonomy." arXiv:1610.01238v3, Nov. 17, 2017.
Kahn, et al. "Self-supervised Deep Reinforcement Learning with Generalized Computation Graphs for Robot Navigation." arXiv:1709.10489v2, Nov. 30, 2017.
Pan, et al. "Spatial As Deep: Spatial CNN for Traffic Scene Understanding." arXiv:1712.06080v1, Dec. 17, 2017.
Richter, et al. "Safe Visual navigation via Deep learning and Novelty Detection." Robotics: Science and Systems XIII, Jul. 12, 2017.
Wang, et al. "Understanding Convolution for Semantic Segmentation." arXIV:1702.08502v2, Nov. 9, 2017.
Wikipedia. "Self-supervised learning." Retrieved from the Internet <https://en.wikipedia.org/wiki/Self-supervised_learning> on May 31, 2022.
Ashok, Ashwin, et al., "Enabling Vehicular Applications using Cloud Services through Adaptive Computation Dffloading." ACM, Sep. 11, 2015.
Cloudera, "Federated learning: distributed machine learning with data locality and privacy." Cloudera Fast Forward Labs, Nov. 14, 2018.
Liebig, Thomas, et al., "Distributed Traffic Flow Prediction with Label Proprotions: From in-Network towards High Performance Computation with MPI" Proceedings of the 2nd International Workshop on Mining Urban Data, 2015.

* cited by examiner

MACHINE LEARNING WITH FEATURE OBFUSCATION

FIELD OF THE TECHNOLOGY

At least some embodiments disclosed herein relate to distributed machine learning with data privacy protection in general, and more particularly, to distributed artificial neural networks with data privacy protection.

BACKGROUND

Artificial neural networks (ANN) are computing systems that can learn to perform tasks without being programmed with instructions for specific operations. An ANN is based on a set of connected nodes or artificial neurons, which are somewhat analogous to neurons in a biological brain. Each connection between nodes can transmit a signal from one artificial neuron to another, and an artificial neuron that receives a signal can process it.

Usually, an ANN is implemented by a signal at a connection (or edge) between artificial neurons being a real number, and the output of each artificial neuron being computed by a non-linear function of the sum of its inputs. Artificial neurons and edges usually have a weight that adjusts as learning by the ANN or training of the ANN proceeds. The weight increases or decreases the strength of the signal at an edge. An artificial neuron can also have a threshold in which a signal is only sent from the artificial neuron if the aggregate signal exceeds the threshold. Usually, artificial neurons are grouped into layers (such as an input layer, one or more middle layers, and an output layer), and each layer can provide a different transformation on inputs to the layer.

With the increasing use of complex artificial neural networks, such as deep neural networks, and the desire to increase the effectiveness of such networks, complexities and challenges have been met by distributing training of artificial neural networks using multiple processors and/or distributed computing. However, with the use of multiple processors or distributing computing there are data privacy concerns (e.g., concerns that the data is authentic) as well as network performance concerns (e.g., concerns with network performance limiting ability for a neural network to meet performance needs of an application).

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
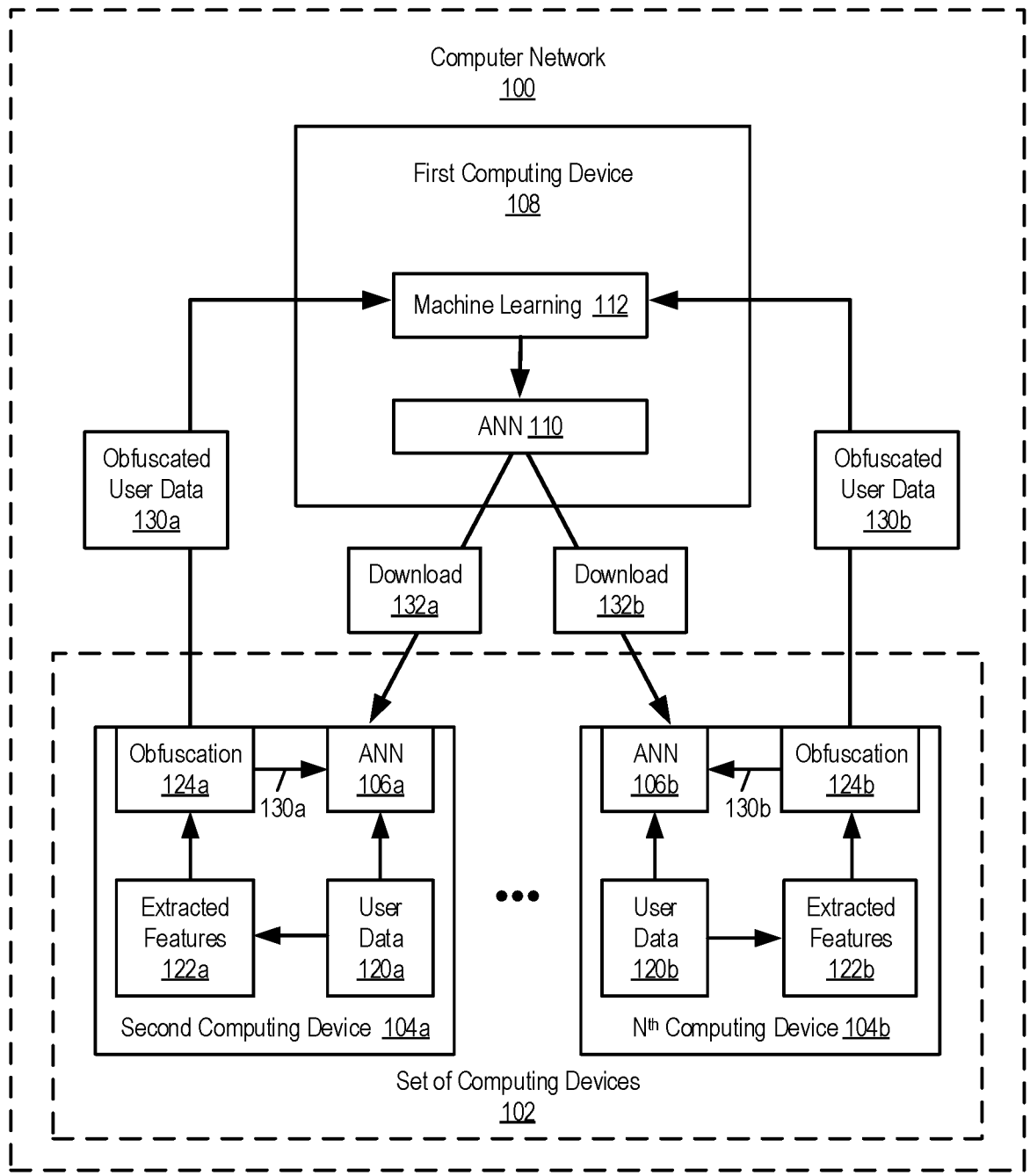
FIGS. 1 and 2 illustrate an example computer network 100 in a configuration to implement obfuscating inputs for centralized training of a master version of an ANN, in accordance with some embodiments of the present disclosure.

At least some aspects of the present disclosure are directed to distributed machine learning with data privacy protection in general, and more particularly, to distributed artificial neural networks with data privacy protection. Also, at least some aspects of the present disclosure are directed to a computer network that can be configured to implement obfuscating inputs for centralized training of a master version of an artificial neural network (ANN).

Disclosed herein is a system that can have multiple computing devices that can host different versions of an ANN. Each computing device of the system can host its own version of the ANN. For example, a first device can host a master version of the ANN, and a second device and other devices of the system can host local versions of the ANN.

In the system, inputs for centralized training of the master version of the ANN can be obfuscated. The obfuscation can occur at any one of the multiple computing devices that host different versions of the ANN such as devices hosting local versions of the ANN. For example, the second computing device in the system can include memory that is configured to store a local version of the ANN and user data for inputting into the local version of the ANN. The second computing device can also include a processor that is configured to extract features from the user data and obfuscate the extracted features to generate obfuscated user data. The second device also can include a transceiver that is configured to transmit the obfuscated user data such as to the first computing device. The first computing device can include a memory that is configured to store the master version of the ANN, a transceiver that is configured to receive obfuscated user data transmitted from the second computing device or another device of the system hosting a local version of the ANN, and a processor that is configured to train the master version based on the received obfuscated user data using machine learning.

Since the user data is obfuscated at the source of the user data, the user data is secured from intrusion by a recipient of the obfuscated user data. When the source of the data (such as the second computing device) transmits the data to the device hosting the master version of the ANN (such as the first computing device) that transmitted data is obfuscated and thus privacy protection of the data occurs to some degree. However, the obfuscated user data is not obfuscated to an extent where it is no longer useful as input for training of the master version of the ANN via machine learning. This is useful especially when the first computing device is or is part of a cloud computing environment and data privacy is a concern.

However, it is to be understood that the input data is obfuscated to a certain degree in the disclosed system for training of the master version of the ANN; thus, the accuracy in the training may take a slight hit. This is one example tradeoff in the system. In some embodiments, the degree of obfuscation can be selected or modified to adjust the level of accuracy of the training of the master version of the ANN versus the level of privacy protection for the user data used as input for the training.

The data obfuscation described herein can prevent another party from accessing and interpreting user data hosted by a user device. For example, the obfuscation can prevent a cloud computing environment or a centralized computer or a peer computer hosting a master version of the ANN from accessing and then interpreting sensitive user data stored on a user device. But, the obfuscation still allows for using the obfuscated user data as input for training the ANN.

Obfuscation can be done many different ways. Some of these ways are described in further detail herein. For example, obfuscation of data can occur via a scrambling or encryption algorithm on the data. It is to be understood, that the obfuscation techniques described herein allow data points that are oriented close to each other (to a certain degree) to remain close to each other after the obfuscation. Otherwise, the correlations between the input of the obfuscation and the output would prevent the ANN from being trainable to make feasible predictions. Thus, for example, a hashing algorithm of data encryption would not be an effective method for data obfuscation for the system, since hashing amplifies differences between original data points. A cluster of original data points will be mapped to unrelated hashed data points. Thus, hashing cannot be used for feature obfuscation in the system. But, there are many other ways of obfuscation that can be used, such as substitution, shuffling, numerical variance methods, scrambling, masking out characters, some other types of encryption not using hashing, and deletion of some values in particular fields.

In some embodiments, obfuscation can be done by combining different sets of inputs and/or by randomizing inputs. For example, let X be input and Y be expected or desired output to be predicted by an ANN. Let A represent the function of the ANN. The prediction made by the ANN can be $Yp=A(X)$. The training of ANN through a supervised machine learning can be represented as adjusting A to minimize the difference between Y and Yp (e.g., $\min|A(X)-Y|$). When a user device has two sets of inputs $\{X1, Y1\}$ and $\{X2, Y2\}$, the user device can obfuscate the inputs by combining the sets and requesting a computer hosting the master version of the ANN to train the master version on $\{Xf, Yf\}$, where $Xf=f(X1, X2)$ and $Yf=f(Y1, Y2)$. For example, $Xf=X1-X2$; and $Yf=Y1-Y2$; or $Xf=W1\ X1+W2\ X2$; and $Yf=W1\ Y1+W2\ Y2$, where W1 and W2 are weights that can be customized to adjust the degree of obfuscation.

In some embodiments, when the input is $Xf=f(X1, X2)$, the expected output may not necessarily be $Yf=f(Y1, Y2)$. Thus, Yf is an estimate. From Xf, the computer hosting the master version of the ANN cannot guess or calculate X1, and/or X2 which is hosted by one of the other computing devices hosting a local version of the ANN. Thus, what is really experienced on the user device is not disclosed to a computer hosting the master version of the ANN. Yf is a good estimate. The server can improve A by training on $\{Xf, Yf\}$.

Also, the last-mentioned obfuscation scheme can be extended to combinations of more than two sets of inputs (e.g., $\{X1, Y1\}$, $\{X2, Y2\}$, $\{X3, Y3\}$, . . . ). When the weights are adjusted such that Xf is close to one of the input set (e.g., X1), the Yf is expected to be a good estimation of what would be really expected from Xf. When Xf moves close to X1, the accuracy of estimate Yf increases, but effect of obfuscation decreases (since it becomes easier to guess X1 from Xf). Thus, in some embodiments, the weights can be configured as obfuscation preferences to balance the need for accuracy and privacy.

Also, in some embodiments, X2 can be a random input. The user device can estimate Y2 by using a current ANN to predict $Y2=A(X2)$. This can further increase the effectiveness of obfuscation at the expense of accuracy.

In some embodiments, one of the devices hosting a local version of the ANN can input user data, stored in its memory, into the local version of the ANN to use and train the local version of the ANN. For example, this can occur in a mobile device of the user. User data, which may include sensitive or private information, is not shared with other devices in its use with the ANN. To put it another way, the machine learning for the ANN can occur locally and privately in that the user data is not shared with other devices and is secured in the device of the user. However, when the user data is shared with other devices for training of other versions of the ANN, such as a master version, the user data can be obfuscated before it is shared.

In some embodiments, one or more devices hosting the master version of the ANN can be part of a cloud computing environment. And, in such embodiments, by obfuscating the user data only in the device of the user, the user data can be kept private from the devices of the cloud. But, the cloud can still benefit from the obfuscated data in that the obfuscated data can be used to train a master version of the ANN in the cloud. The user data without obfuscation is not sent to the cloud to protect the privacy of the user. The unmasked user data however can be used to locally train a local version of the ANN on the device of the user. For example, the user data can be only used to train a local version of the ANN on a user's mobile device (e.g., the user's smart phone, tablet, etc.). When it is shared in the system for training of other versions of the ANN it is always obfuscated by the system.

In some embodiments, the master version of the ANN can be downloaded to the individual devices of users to update and improve the local versions of the ANN stored on the devices. This can improve the accuracy of the locally stored versions of the ANN in areas of the ANN that may have not been improved by training locally alone. Also, the downloaded master version of the ANN can be further trained locally for a customized version of the ANN for the user. The benefit of this is that when the ANN is locally trained on the user device and the data input does not need to be obfuscated.

In general, in the computer network that can be configured to implement obfuscating inputs for centralized training of a master version of an ANN, devices that host the differently trained version of the ANN can perform local training to avoid the transmission of user data unless the user data is obfuscated before transmission. In that only obfuscated user data can be transmitted over a network communicatively coupling the devices of the network. A central device, server, or cloud can then receive the obfuscated user data via the network and use such data to train the master version of the ANN without compromising data privacy. Since the central device, server, or cloud does not have the original user data (such as inputs to local versions of ANN), exposure of the user data to the central device, server, or cloud and the network can be avoided. It is also to be understood, in some embodiments, obfuscation of user data can be used even for the input data for training the local version of the ANN to enhance privacy protection on the user device.

The computer network that can be configured to implement obfuscating inputs for centralized training of a master version of an ANN can protect user privacy while still keeping the benefit of training an ANN using the data of various users. In some embodiments, however, less sensitive data can be sent to the central device, server, or cloud without obfuscating such data. And, sensitive data can be sent after obfuscation of the data.

The ANN updated in the computer network can be in the form of updating neuron attributes and/or connectivity. Changes to versions of the ANN can be done through training using compatible machine learning techniques where the input is or at least includes obfuscated user data. However, the obfuscated user data is not obfuscated beyond a point that updating neuron attributes and/or connectivity using the obfuscated input is detrimental to the effectiveness of the ANN in making expected predictions.

Figure 2:
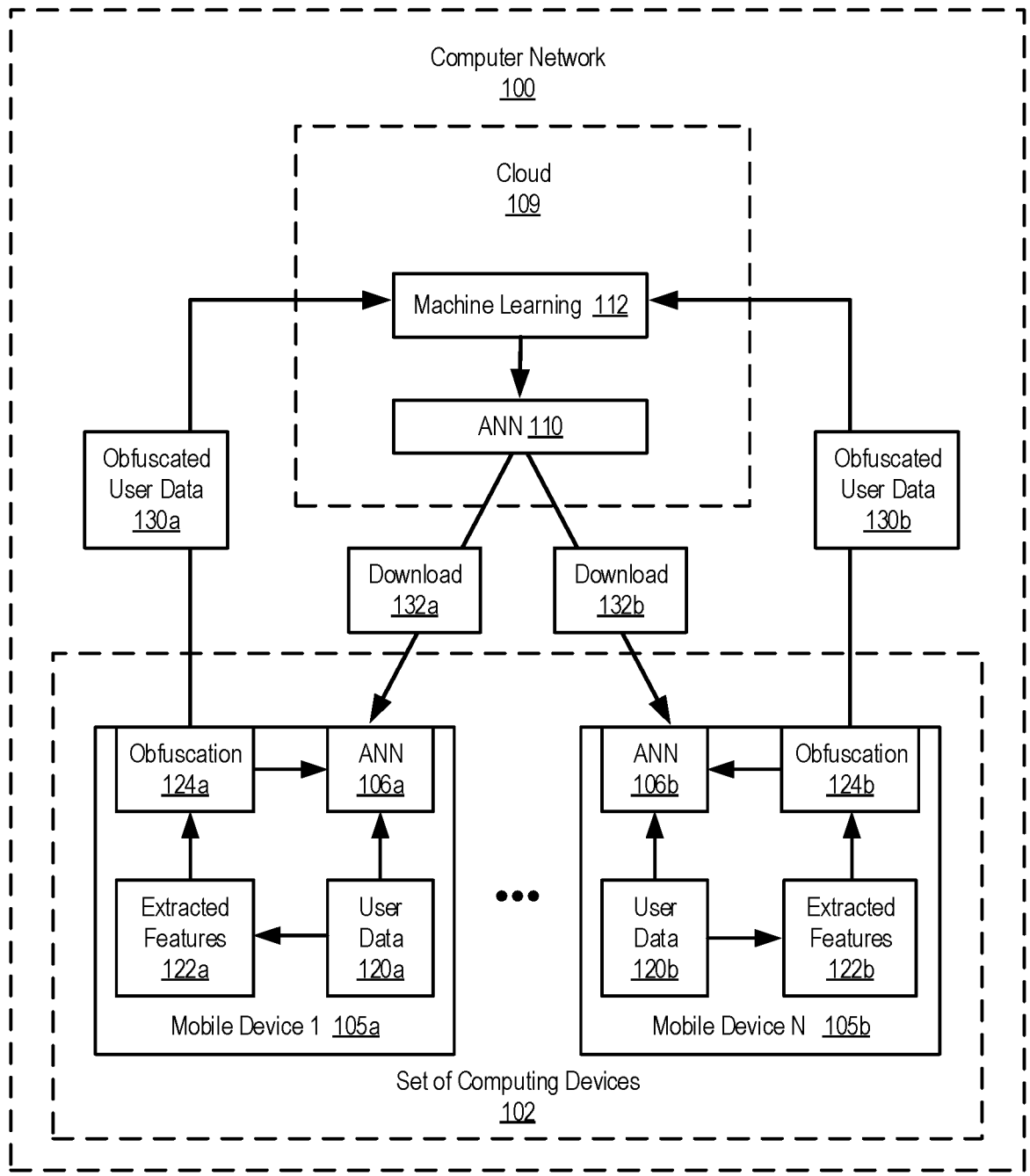

FIGS. 1 and 2 illustrate the computer network 100 in a configuration to implement obfuscating inputs for centralized training of a master version of an ANN, in accordance with some embodiments of the present disclosure.

In FIG. 1, the computer network 100 is shown including a set of computing devices 102. The set of computing devices 102 can include one or more of any type of computing device capable of hosting and executing a version of an ANN, such as any type of mobile device, personal computer, or smart device that is capable of hosting and executing a version of an ANN (e.g., see second computing device 104a and Nth computing device 104b). Each computing device of the set of computing devices 102 can host and execute a local version of an ANN (e.g., see second computing device 104a and Nth computing device 104b having respective local versions of an ANN 106a and 106b).

The computer network 100 is also shown including a first computing device 108. The first computing device 108 can be a single computing device or multiple computing devices distributed over a network, such as distributed over a network of a cloud computing environment. The single computing device or the multiple computing devices embodied by first computing device 108 can include a master version of an ANN 110. The first computing device 108 can be the central device, server, or cloud or a selected device in a peer-to-peer computing network depending on the implementation of the computer network 100.

To put it another way, FIG. 1 illustrates a computer network 100 including the set of computing devices 102 having networked computing devices (e.g., see computing devices 104a and 104b), wherein each networked computing devices stores and uses a separate local version of an ANN (e.g., see the local versions of the ANN 106a and 106b). The computer network 100 also includes the first computing device 108 (which can be part of a cloud or another type of distributed computing network). The first computing device 108 includes the master version of the ANN 110.

The local versions of the ANN (e.g., see the local versions of the ANN 106a and 106b) can be used with user data (e.g., see user data 120a and 120b). Also, local versions of the ANN (e.g., see the local versions of the ANN 106a and 106b) can be used with obfuscated user data (e.g., see obfuscations 124a and 124b as well as obfuscated user data 130a and 130b). Also, user data (obfuscated or not) can be used in training the local versions of the ANN (e.g., see extracted features 122a and 122b).

Obfuscated user data can also be use by the master version of the ANN 110 (e.g., see the obfuscated user data 130a and 130b being sent to machine learning 112 in the first computing device 108) such as for training of the master version. An updated master version of the ANN can then be downloaded by one or more devices of the set of computing devices 102 (e.g., see downloading 132a and 132b). The downloaded master version can replace a local version of the ANN or be combined with the local version of the ANN hosted by one of the devices of the set of computing devices 102.

The master version of the ANN (e.g., see the master version of the ANN 110) can be trained over and over again by received obfuscated data (e.g., see the obfuscated user data 130a and 130b) via machine leaning (e.g., see machine learning 112) such that the master version is generic and becomes more and more accurate over time. The obfuscated data can be received from the devices of different users having the different and local versions of the ANN (e.g., see local versions of the ANN 106a and 106b) and different stored user data (e.g., see user data 120a and 120b). The master version of the ANN (e.g., see the master version of the ANN 110) can be downloaded to the individual user devices (e.g., see computing devices 104a and 104b) to update the user devices capability to benefit from advances in areas that may not have been trained locally (e.g., see downloading 132a and 132b). Also, the downloaded ANN can be further trained locally for a customized version of the ANN for the user.

Not shown, the computer network 100 includes a communications network that includes a wide area network (WAN), a local area network (LAN), an intranet, an extranet, the Internet, and/or any combination thereof. The communications network can communicatively couple the devices of the set of computing devices 102 with each other and with other devices of the computer network 100 such as with the first computing device 108. The sent obfuscated user data and the downloads of the master version of the ANN mentioned herein (e.g., see obfuscated user data 130a and 130b and downloading 132a and 132b) can be communicated or transmitted over the communications network of the computer network 100.

In some embodiments, a system (such as the computer network 100) includes a second computing device (such as the computing device 104a or 104b) that includes memory (such as main memory 508 and/or storage system 512 show in FIG. 5) configured to store a local version of the ANN (such as the local versions of the ANN 106a or 106b). In such embodiments, the second computing device includes a processing device (such as processor 506 show in FIG. 5), configured to train the local version of the ANN. The processing device is also configured to extract a plurality of features from the user data (e.g., see extracted features 122a and 122b and user data 120a and 120b) and obfuscate the extracted plurality of features to generate obfuscated user data (e.g., see obfuscations 124a and 124b and obfuscated user data 130a and 130b). Also, the second computing device can include a transceiver (such as network interface 510) configured to transmit the obfuscated user data (e.g., see obfuscated user data 130a and 130b).

In such embodiments, the system (such as the computer network 100) also includes a first computing device (such as first computing device 108) that includes memory (such as main memory 508 and/or storage system 512 show in FIG. 5) configured to store a master version of the ANN (such as the master version of the ANN 110). The first computing device can also include a transceiver (such as network interface 510) configured to receive the obfuscated user data transmitted from the second computing device. And, the first computing device can also include a processing device (such as processor 506 show in FIG. 5) configured to train the master version of the ANN based on the received obfuscated user data using machine learning (e.g., see machine learning 112).

The second computing device can be one of a plurality of computers hosting respective different versions of the ANN and respective different user data sets (e.g., see set of computing devices 102 and its computing devices 104a and 104b). The second computing device can extract a plurality of features from the respective user data set hosted on the computer (e.g. see extracted features 122a and 122b). The second computing device can obfuscate the extracted plurality of features to generate obfuscated user data (e.g., see obfuscations 124a and 124b). The second computing device can also transmit the obfuscated user data to a selected computer hosting a master version of the ANN (e.g., see obfuscated user data 130a and 130b). The selected computer can train the master version of the ANN based on the obfuscated user data using machine learning (e.g., see first computing device 108 and its machine learning 112).

In general, data obfuscation (also referred to herein as obfuscation) is the process of disguising data through modification to the data. Obfuscation can be applied to the user data stored on a user device (e.g., see user data 120*a* and 120*b*), such as to one or more data fields of the user data, to protect the data that is classified as sensitive such as personal identifiable data, personally sensitive data or commercially sensitive data. However, the obfuscated data can remain usable for training a version of the ANN (e.g., see the main version of the ANN 110) such that the results from training the ANN with the obfuscated data are as expected. In some embodiments, the obfuscated user data appears unmodified.

Figure 3:
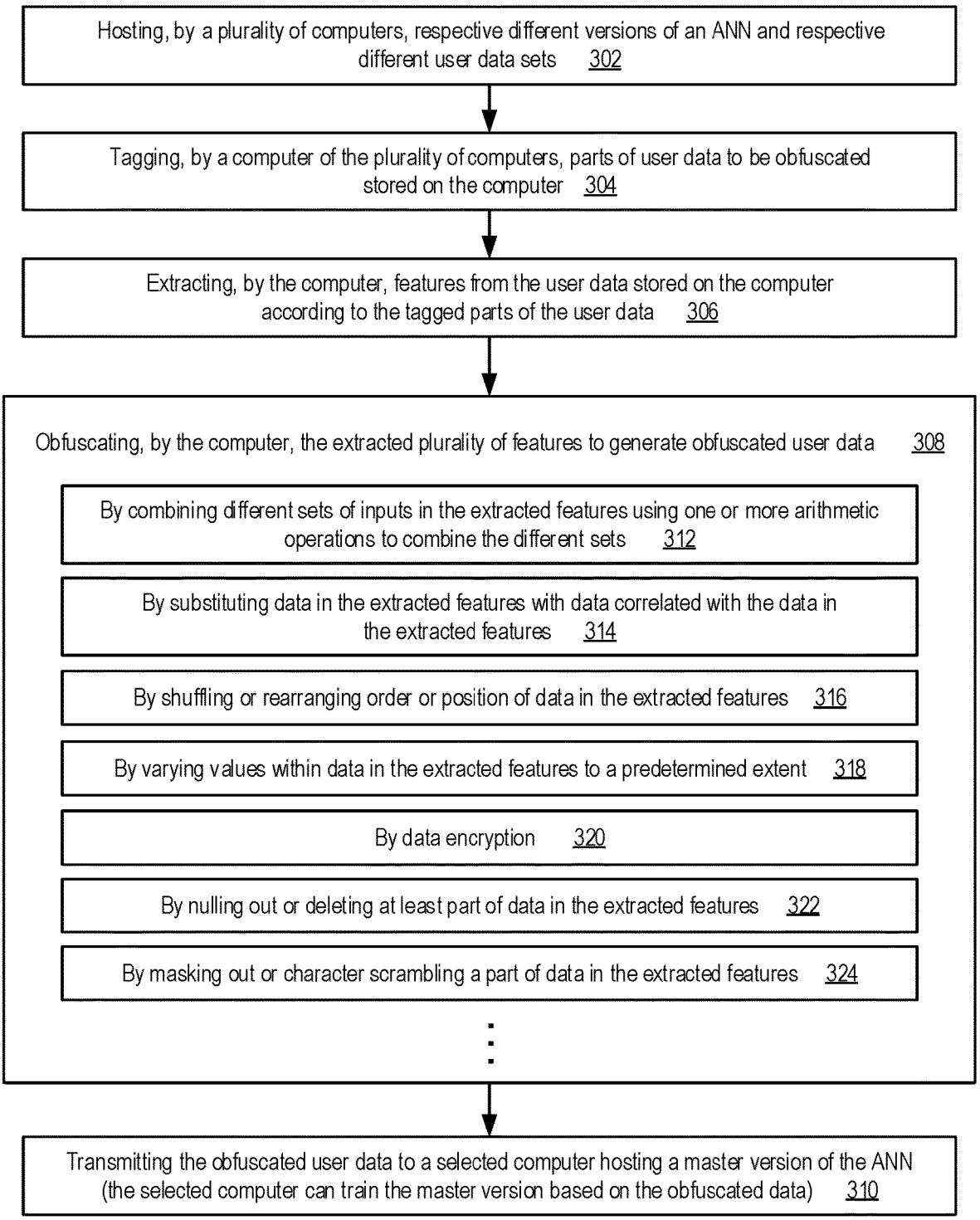
FIGS. 3 and 4 illustrate example methods performed by example parts of the computer network 100 that can implement obfuscating inputs for centralized training of a master version of an ANN, in accordance with some embodiments of the present disclosure.

The obfuscating of the extracted plurality of features can include combining different sets of inputs in the extracted plurality of features using one or more arithmetic operations to combine the different sets (e.g., see obfuscations 124*a* and 124*b* as well as step 312 illustrated in FIG. 3). The extraction of features (e.g., see extracted features 122*a* and 122*b*) can include selecting the different sets of inputs randomly for the combining of the different sets. Or, the extraction of features can include selecting the different sets of inputs deliberately for the combining of the different sets.

Also, the obfuscating of the extracted plurality of features (e.g., see obfuscations 124*a* and 124*b*) can include using substitution (e.g., see step 314 illustrated in FIG. 3). The substitution can include substituting data in the extracted plurality of features with data correlated with the data in the extracted plurality of features.

The obfuscating of the extracted plurality of features (e.g., see obfuscations 124*a* and 124*b*) can also include using shuffling (e.g., see step 316 illustrated in FIG. 3). The shuffling can include rearranging order or position of data in the extracted plurality of features.

The obfuscating of the extracted plurality of features (e.g., see obfuscations 124*a* and 124*b*) can include a numeric variance method (e.g., see step 318 illustrated in FIG. 3). The numeric variance method can include varying values within data in the extracted plurality of features to a predetermined extent. For example, the numeric variance method can include varying values within the data in the extracted plurality of features by, at most, plus or minus a certain percentage or range of percentages for each value, such as varying by, at most, plus or minus 10%.

The obfuscating of the extracted plurality of features (e.g., see obfuscations 124*a* and 124*b*) can also include using data encryption (e.g., see step 320 illustrated in FIG. 3).

It is to be understood, that the obfuscation techniques described herein allow data points that are oriented close to each other (to a certain degree) to remain close to each other after the obfuscation. Otherwise, the correlations between the input of the obfuscation and the output would prevent the ANN from being trainable to make feasible predictions. Thus, for example, a hashing algorithm for an encryption would not be an effective method for data obfuscation for the system, since hashing amplifies differences between original data points. A cluster of original data points will be mapped to unrelated hashed data points. Thus, hashing cannot be used for feature obfuscation in the system.

The obfuscating of the extracted plurality of features (e.g., see obfuscations 124*a* and 124*b*) can also include nulling out or deleting at least part of data in the extracted plurality of features (e.g., see step 322 illustrated in FIG. 3). For example, the obfuscation can include nulling out or deleting at least part of data in the extracted plurality of features randomly. Or, the nulling out or deleting at least part of data in the extracted plurality of features can be done deliberately.

The obfuscating of the extracted plurality of features (e.g., see obfuscations 124*a* and 124*b*) can include using a masking out or character scrambling method (e.g., see step 324 illustrated in FIG. 3). The masking out or character scrambling method can include masking out or character scrambling part of data in the extracted plurality of features.

The first computing device (e.g., see first computing device 108) can be one of a plurality of computers (such as a computer in a cloud computing environment) or a stand-alone computer. In some embodiments, the first computing device can be or include a cloud computing environment (e.g., see FIG. 2). The first computing device can host the master version of the ANN (e.g., see the master version of the ANN 110). The first computing device can also receive obfuscated user data from the second computer (e.g., see obfuscated user data 130*a* and 130*b*).

The obfuscated user data can include a plurality of obfuscated features such as derived from an obfuscation in the second computer (e.g., see obfuscations 124*a* and 124*b*). The second computer can extract a plurality of features from user data locally stored on the second computer (e.g., see extracted features 122*a* and 122*b*) and obfuscate the extracted plurality of features to generate the plurality of obfuscated features before transmitting the obfuscated user data to the first computer (e.g., see obfuscated user data 130*a* and 130*b* being transmitted to the first computing device 108). The second device can obfuscate the extracted plurality of features by combining different sets of inputs using one or more arithmetic operations to combine the different sets. The extracted plurality of features can include parts of the user data tagged to be obfuscated in a data storage system of the second computing device. Also, the second device can obfuscate the extracted plurality of features using substitution, shuffling, a numeric variance method, encryption, or a combination thereof. Further, the second device can obfuscate the extracted plurality of features using nulling out or deleting at least part of the extracted plurality of features (e.g., either randomly or deliberately) or using a masking out or character scrambling method.

The first computer can also train the master version of the ANN (e.g., see the master version of the ANN 110) based on the received obfuscated user data using machine learning (e.g., see machine learning 112).

FIG. 2 is somewhat similar to FIG. 1 in that it shows computer network 100 in a configuration to implement obfuscating inputs for centralized training of a master version of an ANN. However, different from FIG. 1, FIG. 2 depicts specifically the set of computing devices 102 including mobile devices (e.g., see mobile devices 105*a* and 105*b*) hosting respective local versions of the ANN (e.g., see the local versions of the ANN 106*a* and 106*b*). Also, in FIG. 2, it is shown that a cloud computing environment (e.g., cloud computing environment 109) is hosting the master version of the ANN (e.g., see the master version of the ANN 110). In other words, FIG. 2 is a more specific implementation of the computer network shown in FIG. 1, where the first device 108 is or is part of the cloud computing environment 109 and the devices of the set of computing devices 102 are specifically mobile devices (e.g., see mobile devices 105*a* and 105*b*).

Figure 4:
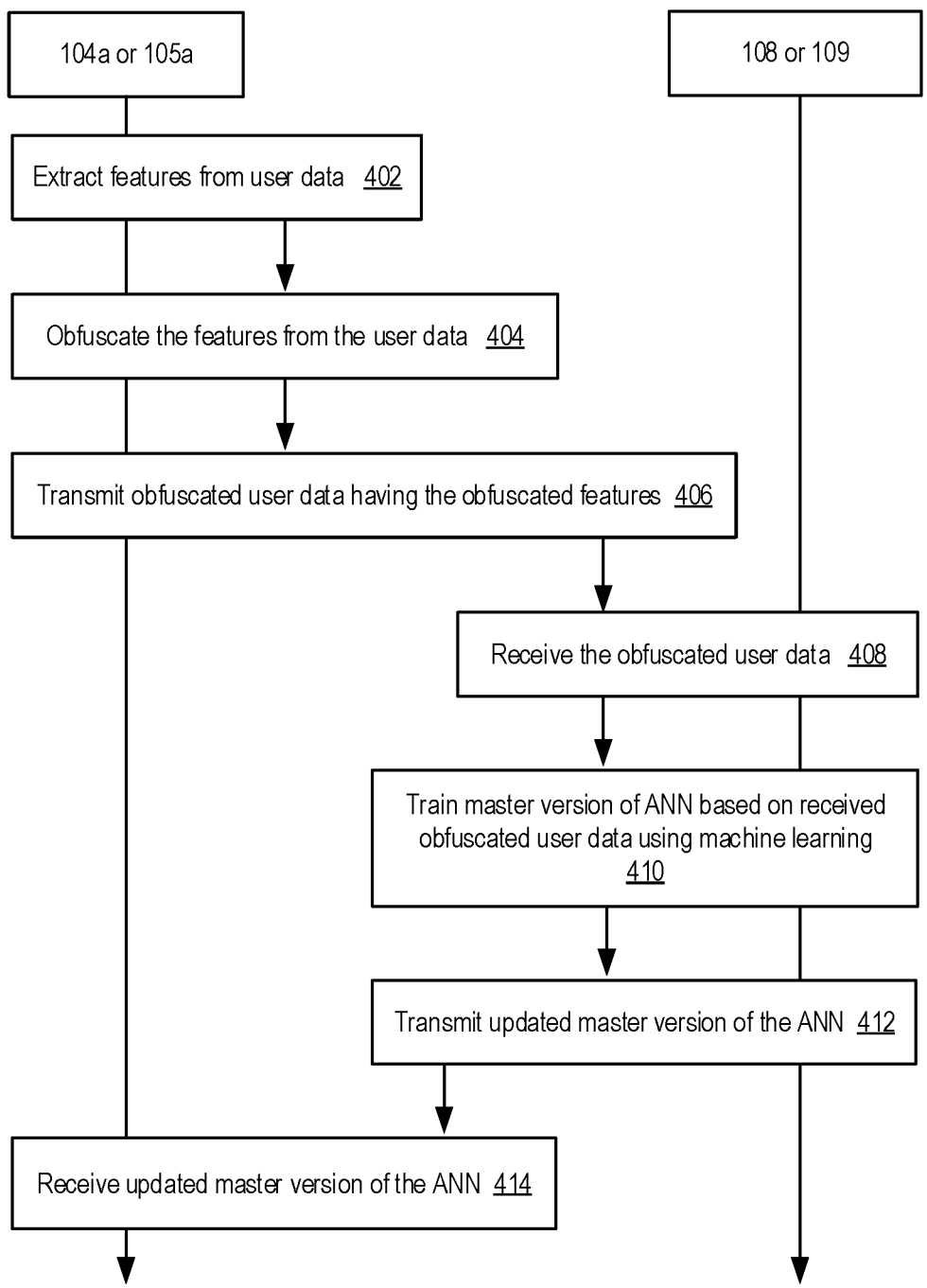

FIGS. 3 and 4 illustrate example methods performed by example parts of computer network 100 that can implement obfuscating inputs for centralized training of a master version of an ANN, in accordance with some embodiments of the present disclosure.

FIG. 3 shows the method 300 performed by computing devices configured to obfuscate inputs for centralized training of a master version of an ANN (e.g., see computing devices 104a and 104b as well as mobile devices 105a and 105b) that are in communication with one or more other computing devices that can host, execute, and train a master version of the ANN (e.g., see first computing device 108 and the cloud computing environment 109). The method 300 begins, at step 302, with hosting, by a plurality of computers, respective different versions of an ANN and respective different user data sets.

At step 304, a computer of the plurality of computers tags parts of the user data to be obfuscated prior to extracting a plurality of features. In some embodiments, the computer tagging parts of the user data can include tagging the parts randomly such that the tagged parts are a random sampling of parts of the user data. In some other embodiments, the computer tagging parts of the user data can include tagging the parts deliberately such that the tagged parts are a deliberate sampling of parts of the user data.

At step 306, the computer extracts the plurality of features according to the tagged parts of the user data. The extracted plurality of features can include the tagged parts of the user data.

At step 308, the computer obfuscates the extracted plurality of features to generate obfuscated user data.

And, at step 310, the computer transmits the obfuscated user data to a selected computer hosting a master version of the ANN. The selected computer can train the master version of the ANN based on the obfuscated user data using machine learning.

At step 312, the obfuscating of the extracted plurality of features at step 308 can occur by combining different sets of inputs in the extracted plurality of features using one or more arithmetic operations to combine the different sets. In some embodiments, the obfuscating can include selecting the different sets of inputs randomly for the combining of the different sets. In some other embodiments, the obfuscating can include selecting the different sets of inputs deliberately for the combining of the different sets.

For example, for the training of the master version of the ANN 110, let X be input (e.g., see the extracted features 122a and 122b) and Y be expected or desired output to be predicted by the ANN. Let A represent the function of the master version of the ANN 110. The prediction made by the master version of the ANN 110 can be $Yp=A(X)$. The training of the master version of the ANN 110 through a supervised machine learning, such as machine learning 112, can be represented as adjusting A to minimize the difference between Y and Yp (e.g., $\min|A(X)-Y|$). When a user device has two sets of inputs $\{X1, Y1\}$ and $\{X2, Y2\}$ in the user data (e.g., see extracted features 122a and 122b), the user device (e.g., see computing devices 104a and 104b) can obfuscate the inputs (e.g., see obfuscation 124a and 124b) by combining the sets and requesting a computer hosting the master version of the ANN 110 (e.g., see first computing device 108) to train the master version on $\{Xf, Yf\}$, where $Xf=f(X1, X2)$ and $Yf=f(Y1, Y2)$. For example, $Xf=X1-X2$; and $Yf=Y1-Y2$; or $Xf=W1\ X1+W2\ X2$; and $Yf=W1\ Y1+W2\ Y2$, where W1 and W2 are weights that can be customized to adjust the degree of obfuscation.

In some embodiments, when the input is $Xf=f(X1, X2)$ (e.g., see extracted features 122a and 122b), the expected output may not necessarily be $Yf=f(Y1, Y2)$. Thus, Yf is an estimate. From Xf, the computer hosting the master version of the ANN 110 (e.g., see first computing device 108) cannot guess or calculate X1, and/or X2 which is hosted by one of the other computing devices hosting a local version of the ANN (e.g., see computing devices 104a and 104b). Thus, what is really experienced on the user device (e.g., see computing devices 104a and 104b) is not disclosed to a computer hosting the master version of the ANN (e.g., see first computing device 108). However, Yf is a good estimate, and the computer hosting the master version of the ANN 110 can improve A by training on $\{Xf, Yf\}$, an obfuscated version of the user data (e.g., see obfuscated user data 130a and 130b).

Also, the last-mentioned obfuscation scheme can be extended to combinations of more than two sets of inputs (e.g., $\{X1, Y1\}$, $\{X2, Y2\}$, $\{X3, Y3\}$, . . . ). In other words, the extracted features (e.g., extracted features 122a and 122b) can include more than two sets of inputs combined in an obfuscation (e.g., see obfuscations 124a and 124b). When the weights are adjusted such that Xf is close to one of the input set (e.g., X1) in the obfuscation (e.g., see obfuscations 124a and 124b), the Yf is expected to be a good estimation of what would be really expected from Xf. When Xf moves close to X1, the accuracy of estimate Yf increases, but effect of obfuscation decreases (since it becomes easier to guess X1 from Xf). Thus, in some embodiments, the weights can be configured as obfuscation preferences to balance the need for accuracy and privacy. Also, in some embodiments, X2 can be a random input. The user device can estimate Y2 by using a current ANN to predict $Y2=A(X2)$. This can further increase the effectiveness of obfuscation.

At step 314, the obfuscating of the extracted plurality of features at step 308 can occur by substitution. And, the substitution can include substituting data in the extracted plurality of features with data correlated with the data in the extracted plurality of features.

The substitution at step 314 can apply data masking and preserve an authentic look and feel for the obfuscated user data. The substitution at step 314 includes substituting existing values in the extracted features of the user data with authentic looking values. For example, the user data can include customer records, personal identifiable information, and other types of sensitive information, and such information can be substituted with randomly or deliberately supplied false customer records, personal identifiable information, and the like respectively such as from a look up file. For instance, the substitution can include substituting a name in the user data with a fake name that is stored in memory such as in a look up file. Also, for example, a social security number can be replaced by a fake social security number in the substitution.

Using substitution can maintain the data structure and formatting of the fields of the user data but can also obscure the data to protect privacy of the user's sensitive information. Substitution can be applied to various other fields in the user data including email addresses, telephone numbers, actual mailing addresses, zip codes, and credit card numbers as well as social security number and other personal identification numbers that can conform to a checksum test such as a checksum test of the Luhn algorithm.

At step 316, the obfuscating of the extracted plurality of features at step 308 can occur by shuffling. And, the shuffling can include rearranging order or position of data in the extracted plurality of features.

The shuffling at step 316 is somewhat similar to substitution but shuffling uses data for substitution from the same data source or the same column of data that is being obfuscated. For example, if the data source or a column of the user data has the user's name in a first row, social security number in a second row, and email address in a third row, shuffling may cause the user's name to go to a different row than the first row and the social security number may be moved to the first row, and so on. As suspected, the aforesaid example of shuffling may not effectively obfuscate such data from prying eyes; however, where it is essential to hide the order of the information in the extracted features of the user data, shuffling can be an effective method of obfuscation that does not disrupt an input for training of the ANN. Also, shuffling can be more effective when combined with substitution. The obfuscation at step 308 can be effective when it uses both substitution and shuffling, and these two methods can be used together without too much disturbance to the training of the ANN.

At step 318, the obfuscating of the extracted plurality of features at step 308 can occur by a numeric variance method. And, the numeric variance method can include varying values within data in the extracted plurality of features to a predetermined extent. For example, the numeric variance method can include varying values within the data in the extracted plurality of features by, at most, plus or minus a certain percentage or range of percentages for each value, such as varying by, at most, plus or minus 10%.

The numeric variance method at step 318 can be useful when obfuscating performance or financial data or other data driven by numbers and quantities. For instance, the numeric variance method can be used and the results of such obfuscation can still leave meaningful data for its use such as for training the ANN. If, for example, payroll data is obfuscated using such a method by a small fraction, the privacy of the information is maintained but the masked data can still be used to make projections such as through an ANN. The numeric variance method at step 318 also can be applied to dates in the user data to obfuscate the data. For example, if the overall data set needs to retain a certain level of integrity then applying a random numeric variance of +/−a couple days to date fields would preserve the date distribution but still prevent traceability back to a known entity.

At step 320, the obfuscating of the extracted plurality of features at step 308 can occur by encryption. The data encryption at step 320 cannot use a hashing algorithm as mentioned herein, since such a method would disrupt the input for training the ANN. The encryption method at step 320 can use a key to be applied to view the data based on user rights. Also, format preserving encryption can be used at step 320 since such a method may preserve the effectiveness of the masked data for training the ANN.

At step 322, the obfuscating of the extracted plurality of features at step 308 can occur by nulling out or deleting at least part of the data in the extracted plurality of features. For example, the obfuscation can include nulling out or deleting at least part of the data in the extracted plurality of features randomly. Or, the nulling out or deleting at least part of the data in the extracted plurality of features can be done deliberately.

The form of masking at step 322 is a simplistic approach to obfuscation by simply applying a null value to a particular field. The null value approach is useful to prevent visibility of a data element in the extracted features, and in some implementations, can disrupt the training of the ANN to an undesirable extent. There are some instances where the masking at step 322 is useful and undisruptive to the training of the ANN.

At step 324, the obfuscating of the extracted plurality of features at step 308 can occur by masking out or a character scrambling method. The masking out or the character scrambling method can include masking out or character scrambling part of data in the extracted plurality of features.

The masking out or the character scrambling method at step 324 is also a simplistic method of preventing sensitive information to be viewed; however, it can be effective at privacy protection and preserving structure and formatting of the user data which can help preserve its usefulness in training an ANN. The masking out or a character scrambling can be useful when applied to credit card data or other numerical identification data in the user data. For instance, a billing reference to the card with the last five digits of XXXX XXXXXX 53495 can be the result of an obfuscation of a full credit card number. A third party can only see the last five digits of the card number once the data is transmitted from the user device, but such data along with other useful data for training an ANN is still intact.

FIG. 4 shows the method 400 performed by computing devices configured to host and execute a master version of an ANN (e.g., see first computing device 108 and cloud computing environment 109 depicted in FIGS. 1 and 2 respectively) and computing devices configured to host and execute other versions of the ANN (e.g., see computing devices 104a and 104b or mobile devices 105a and 105b). Method 400 can include the operations of method 300.

The method 400 begins, at step 402, with extracting, by a second computing device hosting one of the other versions of the ANN (e.g., see computing devices 104a and 104b or mobile devices 105a and 105b), a plurality of features from user data stored on the second computing device.

At step 404, the second computing device (e.g., see computing devices 104a and 104b or mobile devices 105a and 105b) obfuscates the plurality of features from the user data. The obfuscation at the step 404 can include one or more of the steps 308 and 312 to 324 illustrated in FIG. 3.

At step 406, the second computing device (e.g., see computing devices 104a and 104b or mobile devices 105a and 105b) transmits the obfuscated user data having the obfuscated features.

At step 408, a first computing device (e.g., see first computing device 108 and cloud computing environment 109) receives the obfuscated user data.

At step 410, the first computing device trains a master version of the ANN based on the received obfuscated user data using machine learning. The training that occurs at step 410 includes updating of the master version of the ANN. The training of the master version of the ANN at step 410 as well as training other versions of the ANN can be in the form of updating neuron attributes and/or connectivity of the ANN.

At step 412, the first computing device transmits the updated master version of the ANN updated from the training at step 410.

At step 414, the second computing devices receives the updated master version of the ANN. With the updated master version of the ANN, the second computing device can update its local version of the ANN according to the updated master version of the ANN. For example, the second computing device can replace its local version of the ANN with the received updated master version of the ANN.

Not shown in FIG. 4, the local version of the ANN can be trained or re-trained by combining the updated master version with a present local version of the ANN in the user device. And, the combining in the training or re-training can include updates to neuron attributes of the local version of the ANN according to averaging corresponding attributes of the updated master version of the ANN and the "present" or previous local version of the ANN.

For the purposes of steps 402 to 414 of FIG. 4 and this disclosure, it is to be understood that the obfuscated user data (e.g., see obfuscated user data 130a and 30b) that is transmitted from the user devices (e.g., see computing devices 104a and 104b or mobile devices 105a and 105b shown in FIG. 2) to the central device, server, or cloud (e.g., see first computing device 108 or cloud computing environment 109) hosting the master version of the ANN at step 406 can be in the form of an obfuscation at step 404 of the entire extracted features extracted in step 402 or parts of the extracted features extracted in step 402. Also, in some embodiments, the central device, server, or cloud hosting the master version of the ANN can limit what the user devices can extract at step 402 and obfuscate at step 404 to adjust the privacy protection provided by the obfuscation as well as on the other hand adjust the accuracy of the training of the version of the ANN (such as the master version) using the obfuscated user data as input for the training.

Also, it is to be understood that a peer-to-peer network can implement the method 400. In such examples, a first selected device hosts the master version of the ANN for processing and the other devices of the peer-to-peer network host the other versions (e.g., local versions) of the ANN for processing. In such examples, the first selected device executes steps 408 to 412 and the other devices of the peer-to-peer network execute steps 402 to 406 and 414.

With respect to the method 300, method 400, or any other method, process, or operation described herein, in some embodiments, a non-transitory computer-readable storage medium stores instructions that, when executed by at least one processing device (such as processor 506 shown in FIG. 5), cause the at least one processing device to perform the method 300, method 400, or any other method, process, or operation described herein, and/or any combination thereof.

Figure 5:
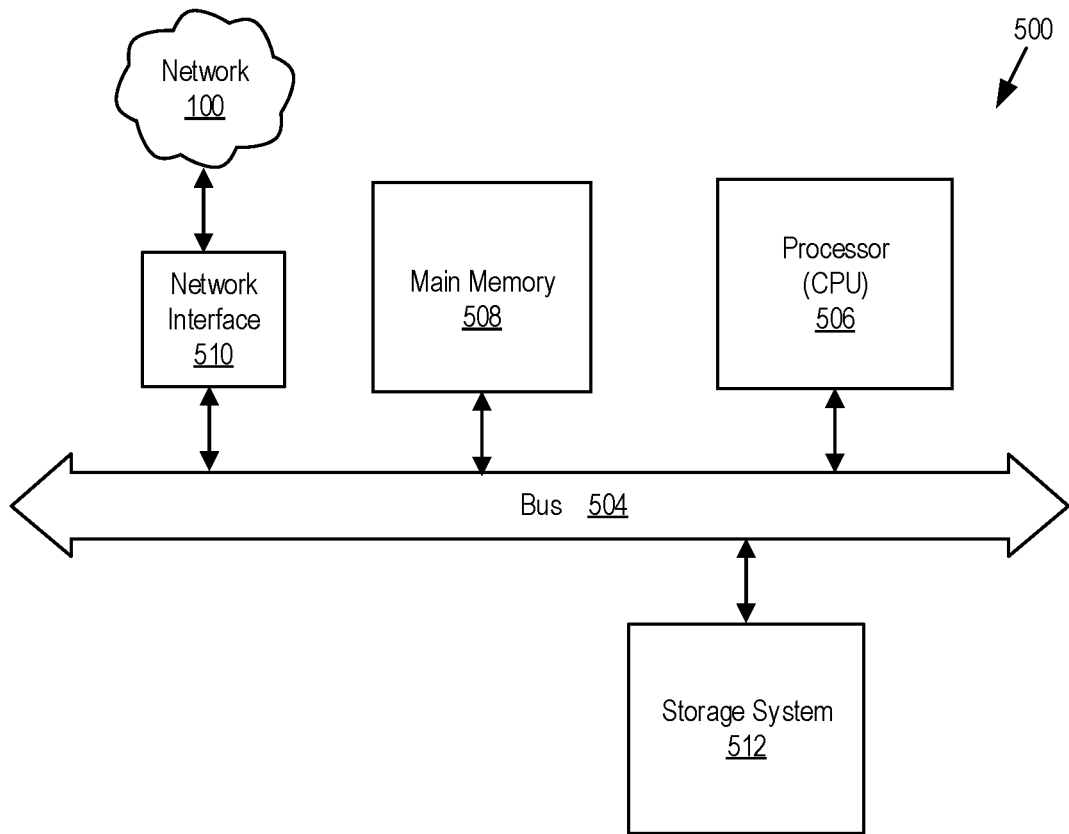
FIG. 5 illustrates an example computing device that can host a master version of the ANN or an example computing device that can host another version of the ANN, in accordance with some embodiments of the present disclosure.

FIG. 5 illustrates example parts of an example computing device 500, in accordance with some embodiments of the present disclosure. The computing device 500 can be communicatively coupled to other computing devices via the computer network 100 as shown in FIG. 5. In some embodiments, computing device 500 is the first computing device 108 or one or more computing devices of the cloud computing environment 109. In such embodiments, another instance of the computing device 500 is one of the computing devices of the set of computing devices 102 (e.g., see computing devices 104a and 104b and mobile devices 105a and 105b). The computing device 500 includes at least a bus 504, a processor 506 (such as a CPU), a main memory 508, a network interface 510, and a data storage system 512. The bus 504 communicatively couples the processor 506, the main memory 508, the network interface 510, and the data storage system 512. The computing device 500 includes a computer system that includes at least processor 506, main memory 508 (e.g., read-only memory (ROM), flash memory, dynamic random access memory (DRAM) such as synchronous DRAM (SDRAM) or Rambus DRAM (RDRAM), static random access memory (SRAM), etc.), and data storage system 512, which communicate with each other via bus 504 (which can include multiple buses)

To put it another way, FIG. 5 is a block diagram of an example computing device 500 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 510) to other machines in a LAN, an intranet, an extranet, and/or the Internet. The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Processor 506 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processor 506 can also be one or more special-purpose processing devices such as an application specific integrated circuit (ASIC), a field programmable gate array (FPGA), a digital signal processor (DSP), network processor, a processor in memory (PIM), or the like. Processor 506 is configured to execute instructions for performing the operations and steps discussed herein. Processor 506 can further include a network interface device such as network interface 510 to communicate over one or more communications network.

The data storage system 512 can include a machine-readable storage medium (also known as a computer-readable medium) on which is stored one or more sets of instructions or software embodying any one or more of the methodologies or functions described herein. The instructions can also reside, completely or at least partially, within the main memory 508 and/or within the processor 506 during execution thereof by the computer system, the main memory 508 and the processor 506 also constituting machine-readable storage media. While the memory, processor, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The peer-to-peer network of some embodiments can be a collection of nodes and peer-to-peer connections. For example, the first computing device 108 or one of computing devices of the set of computing devices 102 can be a node of a peer-to-peer network supported by computing devices connected through computer network 100.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   hosting, by a plurality of computers, respective different versions of an artificial neural network (ANN) and respective different user data sets;
   extracting, by a computer of the plurality of computers, a plurality of features from the respective user data set hosted on the computer;
   obfuscating, by the computer, the extracted plurality of features to generate obfuscated user data; and
   transmitting, by the computer, the obfuscated user data to a selected computer hosting a master version of the ANN, wherein the selected computer trains the master version of the ANN based on the obfuscated user data using machine learning.

2. The method of claim 1, wherein obfuscating the extracted plurality of features comprises combining different sets of inputs in the extracted plurality of features using one or more arithmetic operations to combine the different sets.

3. The method of claim 2, comprising selecting, by the computer, the different sets of inputs randomly for the combining of the different sets.

4. The method of claim 2, comprising selecting, by the computer, the different sets of inputs deliberately for the combining of the different sets.

5. The method of claim 1, further comprising:
   tagging, by the computer, parts of the respective user data set to be obfuscated prior to extracting the plurality of features; and
   extracting, by the computer, the plurality of features according to the tagged parts of the respective user data set, wherein the extracted plurality of features comprises the tagged parts of the respective user data set.

6. The method of claim 5, wherein tagging parts of the respective user data set comprises tagging the parts randomly such that the tagged parts are a random sampling of parts of the respective user data set.

7. The method of claim 5, wherein tagging parts of the respective user data set comprises tagging the parts deliberately such that the tagged parts are a deliberate sampling of parts of the respective user data set.

8. The method of claim 1, wherein obfuscating the extracted plurality of features comprises using substitution, and wherein the substitution comprises substituting data in the extracted plurality of features with data correlated with the data in the extracted plurality of features.

9. The method of claim 1, wherein obfuscating the extracted plurality of features comprises using shuffling, and wherein the shuffling comprising rearranging order or position of data in the extracted plurality of features.

10. The method of claim 1, wherein obfuscating the extracted plurality of features comprises using a numeric variance method, wherein the numeric variance method comprises varying values within data in the extracted plurality of features to a predetermined extent.

11. The method of claim 1, wherein obfuscating the extracted plurality of features comprises using data encryption.

12. The method of claim 1, wherein obfuscating the extracted plurality of features comprises using nulling out or deleting at least part of data in the extracted plurality of features.

13. The method of claim 1, wherein obfuscating the extracted plurality of features comprises using masking out or a character scrambling method, and wherein the masking out or the character scrambling method comprises masking out or character scrambling part of data in the extracted plurality of features.

14. A method, comprising:
   hosting, by a first computer, a master version of an artificial neural network (ANN);
   receiving, by the first computer, obfuscated user data from a second computer, wherein the obfuscated user data comprises a plurality of obfuscated features, and wherein the second computer extracts a plurality of features from user data locally stored on the second computer and obfuscates the extracted plurality of features to generate the plurality of obfuscated features before transmitting the obfuscated user data to the first computer; and training, by the first computer, the master version of the ANN based on the received obfuscated user data using machine learning.

15. The method of claim 14, wherein the second device obfuscates the extracted plurality of features by combining different sets of inputs using one or more arithmetic operations to combine the different sets.

16. The method of claim 14, wherein the extracted plurality of features comprises parts of the user data tagged to be obfuscated in a data storage system of the second computing device.

17. The method of claim 14, wherein the second device obfuscates the extracted plurality of features using substitution, shuffling, a numeric variance method, encryption, or a combination thereof.

18. The method of claim 14, wherein the second device obfuscates the extracted plurality of features using nulling out or deleting at least part of the extracted plurality of features.

19. The method of claim 14, wherein the second device obfuscates the extracted plurality of features using a masking out method or a character scrambling method.

20. A system, comprising:
a second computing device, comprising:
memory configured to store a local version of an artificial neural network (ANN) and user data for inputting into the local version of the ANN;
a processor configured to extract a plurality of features from the user data and obfuscate the extracted plurality of features to generate obfuscated user data; and
a transceiver configured to transmit the obfuscated user data; and
a first computing device, comprising:
memory configured to store a master version of the ANN;
a transceiver configured to receive obfuscated user data transmitted from the second computing device; and
a processor configured to train the master version of the ANN based on the received obfuscated user data using machine learning.

* * * * *